United States Patent [19]

Harbourne

[11] 4,226,905

[45] Oct. 7, 1980

[54] MANUFACTURE OF FILM FROM PARTIALLY CROSSLINKED POLYETHYLENE

[75] Inventor: David A. Harbourne, Kingston, Canada

[73] Assignee: Du Pont Canada Inc., Montreal, Canada

[21] Appl. No.: 30,708

[22] Filed: Apr. 16, 1979

[30] Foreign Application Priority Data

Apr. 18, 1978 [GB] United Kingdom ............... 15202/78

[51] Int. Cl.² ..................... B29D 23/04; C08F 110/02
[52] U.S. Cl. ................................. 428/220; 204/159.2; 264/22; 264/209; 264/236; 264/563; 264/564; 525/240; 525/335; 526/348.1
[58] Field of Search ................. 264/22, 209, 236, 563, 264/564; 204/159.2; 428/220; 526/348.1; 525/240, 335

[56] References Cited

U.S. PATENT DOCUMENTS

| | | | |
|---|---|---|---|
| 2,981,668 | 4/1961 | Brasch | 204/159.2 |
| 3,075,948 | 1/1963 | Santelli | 525/263 |
| 3,144,398 | 8/1964 | Rainer et al. | 525/335 X |
| 3,144,399 | 8/1964 | Rainer et al. | 525/335 X |
| 3,201,503 | 8/1965 | Benning et al. | 264/236 X |
| 3,250,825 | 5/1966 | Martinovich | 428/220 X |
| 3,361,861 | 1/1968 | Bertinotti et al. | 526/348.1 |
| 3,563,870 | 2/1971 | Tung et al. | 264/22 X |
| 3,592,881 | 7/1971 | Ostapchenko | 525/335 X |
| 3,646,155 | 2/1972 | Scott | 525/288 |
| 3,663,662 | 5/1972 | Golike et al. | 204/159.2 X |
| 3,694,524 | 9/1972 | Tinger et al. | 525/240 X |
| 3,736,218 | 5/1973 | Gregorian et al. | 204/159.2 X |
| 3,891,737 | 6/1975 | Marsh et al. | 264/563 X |

FOREIGN PATENT DOCUMENTS 460963  11/1949  Canada .

*Primary Examiner*—Howard E. Schain

[57] ABSTRACT

The present invention provides a process for the manufacture of a polyethylene film having improved tear strength in the transverse direction. The process involves extruding a partially crosslinked polyethylene into film having a thickness between 10 and 100 μm, by a blown film process. The blow-up ratio is in the range of 1.2:1 to 4:1 and the MD draw-down ratio is in the range of 2 to 60. Polyethylenes used in the present invention had prior to being partially crosslinked a density in the range of 0.940 to 0.970 g/cm³ and a melt index in the range of 0.2 to 15.0 g/10 min. The polyethylene is crosslinked to an extent sufficient to provide a film having an Elmendorf tear strength in the transverse direction substantially less than the tear strength of film made from the uncrosslinked polyethylene. Crosslinking may be accomplished using any known method e.g. by irradiation, through use of crosslinking agents.

The film so produced is useful in packaging operations where transverse cutting or tearing performance of the film is important.

15 Claims, No Drawings

MANUFACTURE OF FILM FROM PARTIALLY CROSSLINKED POLYETHYLENE

The present invention relates to an improved process for the manufacture of polyethylene film. In particular the present invention relates to a process for the manufacture of film from polyethylene that has been partially crosslinked.

Methods for the manufacture of polyethylene film are known. One of these methods is the so-called conventional blown film process, an embodiment of which is described by E. G. Fuller in Canadian Pat. No. 460,963 which issued on Nov. 8, 1949. In a conventional blown film process molten polyethylene is extruded through an annular die having a die gap between about 0.38 mm and 1.30 mm. The tubular molten polyethylene so formed is continuously withdrawn from the die, cooled to the solid state, flattened and wound up on a roll. The molten polyethylene is usually cooled, by means of an air ring, soon after the polyethylene is extruded through the die. The tubular film may be expanded to the desired extent by means of, for example, a controlled pressure of gas inside the tubular film.

The term "blow-up ratio" as used herein means the ratio of the diameter of the solidified expanded film tubing to the diameter of the annular die, in a blown film process.

The term "MD draw down ratio" as used herein means the ratio of the width of the die gap of the annular die to the product of the blow-up ratio and the thickness of the film.

The term "frost line" as used herein refers to a narrow zone on the extruded polyethylene film within which the polyethylene changes from a molten or semi-molten state to a solid state. With polyethylenes which do not contain opacifying fillers, e.g. pigments, the change of state causes a change in optical properties of the film, which is readily observable by the naked eye. The term "frost line height" refers to the distance between the annular die and the frost line.

One of the important factors in determining the economics of the manufacture of polyethylene film is the rate at which the film is produced. In blown film processes a high rate of production is most usually accomplished by producing the film using a large diameter die and a low blow-up ratio, e.g., in the range of about 1.5 to 2.0. In addition wide die gaps may sometimes be used to increase the rate at which the film is produced.

Such blown film processes, when used to manufacture high density polyethylene film i.e. film made from polyethylene having a density in the range of 0.940 to 0.970 g/cm$^3$, tend to result in film having a relatively low tear strength in the machine direction (MD) and relatively high tear strength in the transverse direction (TD). The term "tear strength" as used herein is the Elmendorf tear strength as measured by the procedure of ASTM D-1922.

Films having high TD tear strengths are undesirable for use in applications where tearing or cutting in the transverse direction is important, for example, in the manufacture of bags e.g. self opening square or notion and millinery bags, or for the ease of opening sealed packages, e.g. cereal or chip liners. In such applications and in those where it is desired to replace paper by polyethylene film, it is often desirable that the film tear as easily in the transverse direction as it does in the machine direction i.e. provide a film that has a "balanced tear," and that the tear strength be low. It is known that the TD tear strength of polyethylene film may be lowered by increasing the frost line height, increasing the blow-up ratio, decreasing the die gap, and incorporating inorganic fillers into the polyethylene, among other techniques. However some of these techniques, for many polyethylene films, tend to lower the rate of production of film and/or sacrifice quality related properties of the film e.g. film gauge uniformity.

An increase in melt index of the polyethylene, as measured by the procedure of ASTM D-1238 (condition E) also permits higher extrusion rates than are possible for polyethylenes or lower melt index, and aids in reducing the TD tear strength of film produced therefrom. However, as the melt index is increased, the melt strength of the polyethylene tends to be decreased and may make the blown film process unstable and/or the impact strength of the film produced therefrom unacceptably low for many applications.

A method for improving melt strength and melt extensibility of polyethylene having a density of 0.95–0.97 g/cm$^3$ and a melt index of 3–13 g/10 min is described by Lu Ho Tung et al. in U.S. Pat. No. 3,563,870 which issued Feb. 16, 1971. The method involves exposing the polyethylene to 0.05 to 0.30 megarad (5000 to 30000 J/kg) of high energy radiation.

An improved process for the manufacture of polyethylene film, especially with regard to the tear of such film in the transverse direction has now been found.

Accordingly, the present invention provides a blown film process in which partially crosslinked polyethylene is extruded into film having a thickness in the range of 10 to 100 μm, said process having a blow-up ratio in the range of 1.2:1 to 4:1 and a MD draw down ratio in the range of 2 to 60, said polyethylene having had before crosslinking, a density in the range of 0.940 to 0.970 g/cm$^3$ and a melt index in the range of 0.2 to 15.0 g/10 min and having been crosslinked to an extent sufficient to provide, after extrusion in said blown film process, a film having an Elmendorf tear strength in the transverse direction substantially less than the Elmendorf tear strength in the transverse direction of a film produced from the polyethylene, before crosslinking, under the same conditions as the film produced from the partially crosslinked polyethylene.

It is preferred that the film thickness be in the range of 15 to 100 μm and the MD draw down ratio be in the range of 3 to 60.

In a preferred embodiment of the process of the present invention the polyethylene is crosslinked to an extent sufficient to provide a film having an Elmendorf tear strength in the transverse direction in the range of 0.4 to 10 g/μm, especially in the range of 0.4 to 2.5 g/μm, the film being extruded to a thickness between 25 and 35 μm.

In another embodiment the polyethylene is crosslinked to an extent sufficient to provide a film having an Elmendorf tear strength in the transverse direction in the range of 10 to 150 g, the film being extruded to a thickness between 35 and 100 μm.

The MD draw down ratio is most preferably in the range of 6 to 40. The preferred range for the blow up ratio is from 1.2:1 to 2.5:1. Frost line height is preferably in the range of 10 to 66 cm, most preferably from 10 to 40 cm.

In yet another embodiment the polyethylene is a homopolymer of ethylene, especially a linear homopolymer of ethylene, or a copolymer of ethylene and a higher α-olefin or mixture thereof.

In the process of the present invention molten polyethylene is extruded through an annular die. The extruder and die must be capable of supplying a substantially homogeneous stream of molten polymer to the lips of the die. In order to control the process and to facilitate the manufacture of a uniform product, the variation in thickness of the molten polymer extruded through the lips of the die preferably is low. The temperature of the molten polymer when it is extruded through the annular die, while being important in maintaining the frost line at a desired position, may depend in part on the melt flow and melt strength properties of the polymer. The term "melt flow properties" of the polymer is a general term used to describe the processability of a polymer at different temperatures. For example, because of differences in molecular weight, molecular weight distribution, degree of branching and the like, it may be necessary to process polyethylenes of different types at different temperatures in order to achieve, for each particular polyethylene, a uniform flow of polymer from the extruder. The term "melt strength" relates to the strength of the polymer in a molten state especially with regard to the ability of the polymer to support its own weight without significant distortion of, for example, the tubular film of molten polymer.

Conventional blown film processes for the manufacture of polyethylene film are normally operated with the film being extruded in a vertical direction. After extrusion of the molten polymer through the annular die, the tubular film is expanded to the desired extent, cooled or allowed to cool and flattened. The tubular film is flattened by passing the film through a set of nip rolls. A positive pressure of gas, for example air or nitrogen, is maintained inside the tubular film so that the desired degree of expansion of the tubular film occurs.

The polymer used in the process of the present invention is polyethylene, having a density in the range 0.940–0.970 g/cm$^3$. Such polyethylene may be a homopolymer of ethylene or a copolymer of ethylene and a higher α-olefin having 4–10 carbon atoms e.g. butene-1, hexene-1 or octene-1. The polyethylene may be manufactured by processes known to those skilled in the art. In a preferred embodiment the homopolymer is a linear homopolymer of ethylene. In a particular embodiment the polyethylene is a homopolymer of ethylene or a copolymer of ethylene and a higher α-olefin obtained from a low pressure polymerization process in which the monomers are polymerized in the presence of a coordination catalyst. In a preferred embodiment the polymerization process is a solution polymerization process.

In order to obtain the improvement of the present invention, the polyethylene is partially crosslinked. The amount of crosslinking is such that the polyethylene so obtained is partially crosslinked i.e. more crosslinked than the untreated polymer, but not crosslinked to the extent that the polymer is no longer thermoplastic.

Crosslinking of the polyethylene is carried out to an extent sufficient to effect a substantial reduction in the TD tear strength of the film made by the blown film process of the present invention. There appears to be a threshold amount of crosslinking below which the TD tear strength of the film produced is substantially unaffected. The amount of crosslinking required depends in a large part upon the level of TD tear strength and the imbalance of MD and TD tear strengths of film made from the uncrosslinked polyethylene.

For example an unmodified polyethylene extruded at a high MD draw down ratio and at a low blow-up ratio would require more crosslinking than the same unmodified polyethylene extruded at a lower MD draw down ratio and a higher blow-up ratio in order to effect a given low level of TD tear strength or a given extent of balance of MD to TD tear strengths. Similarly a polyethylene containing a filler e.g. ground mica would require less crosslinking than an unfilled polyethylene would, to effect the same low level of TD film tear strength. It may be seen from the examples hereinafter that substantial changes in Elmendorf TD tear strength may be effected by crosslinking the polyethylene beyond the threshold value required for each polyethylene. For example, it may be seen that substantial reductions, to 50% and less of the value of the Elmendorf TD tear strength of the blown film made from the uncrosslinked polyethylene, may be effected by partial crosslinking.

A number of methods are known for the crosslinking of polymers, including polyethylene. Such methods may in general be controlled so as to effect the partial crosslinking of the polyethylene used in the process of the present invention. Examples of methods of crosslinking of polyethylene are the use of organic peroxides e.g. di-α-cumyl peroxide, ditertiary butyl peroxide, α,α'-bis(t-butyl peroxy) diisopropyl benzene, and 2,5-dimethyl 2, 5-di(t-butylperoxy) hexyne-3, the use of other organic crosslinking agents e.g. α,α'-azodiisobutyronitrile, the use of silane crosslinking agents e.g. as disclosed in U.S. Pat. No. 3,075,948 which issued Jan. 29, 1963 to T. R. Santelli, and U.S. Pat. No. 3,646,155 which issued Feb. 29, 1972 to H. G. Scott, and the use of high energy radiation. Representative of such radiation are beta rays, gamma rays, X-rays, electron beams, neutrons and the like.

A variety of techniques are known in the art for effecting crosslinking of polyethylene. If the techniques involve incorporation of a crosslinking agent e.g. organic peroxide, other organic crosslinking agents, or silane crosslinking agents, in the polyethylene, the agent may be metered into the extruder being used for the manufacture of the polyethylene film, thereby directly forming the films of partially crosslinked polyethylene. Alternatively, the agent may be metered into the polyethylene in an extruder and with or without crosslinking the polyethylene, forming pellets of the polyethylene which are subsequently extruded into film. Instead of metering the agent into the polyethylene in an extruder, the agent may be coated onto and/or impregnated into pellets of the polyethylene.

If irradiation techniques are used, the shape or form of the polyethylene during irradiation is not particularly critical. However, it is generally desirable to carry out irradiation on polyethylene in the form of particles having diameters of less than six millimeters e.g. powders, beads, pellets or the like. During irradiation, steps should be taken to ensure that the polyethylene is treated in a reasonably uniform manner and especially so that gel is not formed in the film subsequently manufactured from the treated polyethylene.

Other additives, for example, fillers, especially lamellar fillers e.g. mica and talc, pigments, stabilizers and antioxidants may be incorporated into the polyethylene.

Pigments may, depending on the pigment type, form, size and concentration in the polyethylene, modify the properties of the films obtained by the process of the present invention.

However some additives, especially antioxidants may have an effect on the partial crosslinking of the polyethylene and on the long term stability of films produced therefrom.

The uniformity of the partial crosslinking of the polyethylene should be such that no significant amount of gel is formed in the polymer and hence in the film subsequently manufactured.

It has also been found that the processability in a blown film process of certain uncrosslinked polyethylene resins may be improved and the TD tear strength of the film resulting therefrom lowered by blending the uncrosslinked polyethylene with a partially crosslinked polyethylene according to the present invention. As will be readily understood the higher the TD tear strength of blown film resulting from extrusion of the uncrosslinked polyethylene the greater the concentration of partially crosslinked polyethylene in the blend would be required. It has been found that no significant benefit is obtained, even with uncrosslinked polyethylenes which produce films of lower TD tear strength, unless the concentration of partially crosslinked polyethylene in the blend is at least 20% by weight i.e. there is at most 80% by weight of uncrosslinked polyethylene in the blend.

Blending of the two polyethylenes provides further versatility to the present invention. It may be used for example for making a film having an inorganic filler in which a "masterbatch" of polyethylene compounded with the inorganic filler is blended with a second polyethylene prior to extrusion into film. The second polyethylene may, advantageously, be a partially crosslinked polyethylene as used in the present invention.

As stated hereinabove, the process of the present invention results in the formation of polyethylene film of improved properties especially with respect to the Elmendorf tear strength in the transverse direction. Relatively low values of such tear strength e.g. values of less than 2.5 g/μm are beneficial especially in the cutting of such film during packaging operations. Films of 25 to 35 μm thickness and an Elmendorf tear strength in the transverse direction less than about 2.5 g/μm are easily torn by hand in the transverse direction and demonstrate good cutting performance on certain packaging machines which normally are fed with paper as the packaging material. For use in such packaging machines, it may be advantageous, in addition to selecting a film having a low Elmendorf TD tear strength, to select a film having a low MD elongation, i.e. less than about 200% and more particularly less than 100%.

MD elongation values as shown herein were measured by the procedure of ASTM 1248-60T/D 412-51T, using a D412-68 Type C sample configuration at an extension speed of 50.8 cm/min.

The present invention is illustrated by the examples following.

Dart drop was measured by the procedure of ASTM-D 1709, with the exception that the dart was 38.1 mm in diameter and had a nylon head, and the dart was dropped from a height of 25.4 cm. Results reported as "$F_{50}$" represent value at failure of 50 percent of the samples tested.

EXAMPLE 1

Samples of polyethylene were irradiated with gamma rays or electron beams to partially crosslink the polyethylene. The polyethylene so treated were extruded into film using conventional film blowing apparatus. $TiO_2$ pigment was added at the extruder to provide a $TiO_2$ concentration in the film of 2% wt/wt. The annular die used had a diameter 10.160 cm and the die gap was 1.016 mm. The operating conditions of the blown film process were adjusted to form a film about 25.4 μm in thickness.

Polyethylene type A used in Runs 1 to 3 was an ethylene copolymer having, prior to irradiation, a broad molecular weight distribution, a density of 0.950 g/cm³ and a melt index of 0.45, available from Du Pont of Canada Ltd. Montreal, Canada, under the trade mark SCLAIR ® and designated type 58A.

Polyethylene Type B, used in Runs 4 to 12 was an ethylene copolymer having, prior to irradiation, an intermediate molecular weight distribution, a density of 0.945 g/cm³ and a melt index of 0.26 g/10 min available from Du Pont of Canada Ltd. under the trade mark SCLAIR and designated Type 16A.

Polyethylene type C, used in Runs 13 and 14 was an ethylene homopolymer having, prior to irradiation, a narrow molecular weight distribution, a density of 0.960 g/cm³ and a melt index of 7.3 g/10 min.

Polyethylene type D, used in Run 15 was an ethylene homopolymer having an intermediate molecular weight distribution, a density of 0.960 g/cm³ and a melt index of 1.67 g/10 min.

Further experimental details and the results obtained are shown in Tables I and II.

TABLE I

| Run | PE[1] Type | Irr.[2] Type | Irr.[2] Dosage (J/g) | Melt Index* (g/10 min) | Frost Line Height (cm) | Blow-up Ratio |
|---|---|---|---|---|---|---|
| 1** | A | none | 0 | 0.45 | 30 | 3:1 |
| 2 | A | γ[3] | 27.0 | 0.15 | 23 | 3:1 |
| 3 | A | E[4] | 63.0 | 0.04 | 23 | 3:1 |
| 4** | B | none | 0 | 0.26 | 23 | 3:1 |
| 5 | B | E[4] | 25.0 | 0.10 | 23 | 3:1 |
| 6 | B | E[4] | 38.0 | 0.06 | 23 | 3:1 |
| 7** | B | none | 0 | 0.26 | 66 | 3:1 |
| 8 | B | E[4] | 25.0 | 0.10 | 66 | 3:1 |
| 9 | B | E[4] | 38.0 | 0.06 | 66 | 3:1 |
| 10** | B | none | 0 | 0.26 | 66 | 2:1 |
| 11 | B | E[4] | 25.0 | 0.10 | 66 | 2:1 |
| 12 | B | E[4] | 38.0 | 0.06 | 66 | 2:1 |
| 13 | C | γ[3] | 125 | 1.35 | 66 | 2:1 |
| 14 | C | γ[3] | 125 | 1.35 | 66 | 3:1 |
| 15** | D | none | 0 | 1.67 | 30 | 3:1 |

[1] PE = polyethylene
[2] Irr = Irradiation
[3] γ = gamma ray
[4] E = electron beam
*Melt index of partially crosslinked polyethylene determined after crosslinking but prior to extrusion into film
**Comparison runs. The polyethylene in these runs had not been crosslinked.

TABLE II

| | Elmendorf Tear Strength (g/μm) | | Dart Drop | MD |
|---|---|---|---|---|
| Run | Machine Direction | Transverse Direction | $F_{50}$ (g/μm) | Elongation % |
| 1* | 0.76 | 45 | 20 | 530 |
| 2 | 0.84 | 35 | 1.3 | 640 |
| 3 | 0.64 | 1.2 | ≦1.3 | 49 |
| 4* | 0.52 | 49 | 2.0 | 405 |
| 5 | 0.52 | 9.7 | 5.0 | 530 |
| 6 | 0.60 | 6.8 | 3.3 | 510 |
| 7* | 0.68 | 22 | 14.0 | 460 |
| 8 | 0.88 | 2.5 | 8.0 | 720 |
| 9 | 0.84 | 1.2 | 5.7 | 730 |
| 10* | 0.52 | 36 | 12.0 | — |

TABLE II-continued

| Run | Elmendorf Tear Strength (g/μm) Machine Direction | Elmendorf Tear Strength (g/μm) Transverse Direction | Dart Drop F50 (g/μm) | MD Elongation % |
|---|---|---|---|---|
| 11 | 0.72 | 3.6 | 7.8 | 630 |
| 12 | 0.64 | 3.1 | 6.0 | 570 |
| 13 | 0.69 | 1.7 | 2.4 | 820 |
| 14 | 0.86 | 1.3 | 2.3 | 690 |
| 15* | 0.72 | 6.9 | 2.9 | 760 |

*Comparison runs. The polyethylene in these runs had not been crosslinked.

The results show that partial crosslinking of the polyethylene, as indicated by melt index resulted in the manufacture of polyethylene film having reduced Elmendorf tear strength in the transverse direction. It may also be seen from Runs 1, 2 and 3 that there appears to be a threshold level of irradiation, over which a polyethylene must be irradiated in order to significantly alter the properties, particularly the Elmendorf tear strength in the transverse direction, of the film produced therefrom.

A comparison of Run 15 with the other Runs appears to indicate that a high melt index per se is insufficient to provide a film having a very low Elmendorf TD tear strength.

EXAMPLE II

The procedure of Example I was repeated except that the polyethylenes were partially crosslinked using an organic peroxide viz 2,5-dimethyl 2,5-di(t-butylperoxy) hexyne-3, as the crosslinking agent. Runs 18 to 20 did not have the $TiO_2$ pigment added.

Crosslinking of the polyethylenes was accomplished in a two-stage procedure. The polyethylene to be partially crosslinked i.e. base resin was compounded at a temperature of less than about 150° C. with the requisite amount of concentrate of 2,5-dimethyl 2,5-di(t-butyl peroxy) hexyne-3 in low density polyethylene. The amount of low density polyethylene introduced was not sufficient to cause any noticeable difference in the behaviour of the base resin. A second, high temperature e.g. about 200° C., compounding was then employed to completely decompose the peroxide and bring about the required extent of crosslinking of the base resin, after which the partially crosslinked polyethylene was extruded into pellets suitable for further processing into film. The masterbatch of 2,5-dimethyl 2,5 di(t-butyl peroxy) hexyne-3 in low density polyethylene used to prepare the partially crosslinked polyethylenes used in Runs 17, 19, 20, 22 and 23 had 0.9% wt of the peroxide/wt of polyethylene.

Polyethylene type B used in Runs 16 and 17 was SCLAIR 16A polyethylene resin as in Example I. Polyethylene type E used in Runs 18 and 19 was blend of 3 parts by weight of an ethylene homopolymer having prior to crosslinking a broad molecular weight distribution, a density of 0.960 g/cm³ and a melt flow index of 0.75 g/10 min, available from Du Pont of Canada Ltd. under the trade mark SCLAIR, to 1 part by weight of a second polyethylene having a melt index of 4.7 g/10 min, an intermediate molecular weight distribution and a density of 0.952 g/cm³ containing 40% by weight of ground mica. Only the SCLAIR polyethylene of the polyethylene type E blend was partially crosslinked using the peroxide. The melt index shown for Run 19 indicates the melt index determined for the crosslinked SCLAIR polyethylene and not for the polyethylene type E blend. Polyethylene type F used in Run 20 was a blend of 3 parts by weight of an ethylene homopolymer having prior to crosslinking a narrow molecular weight distribution, a density of 0.96 g/cm³ and a melt index of 7.3 g/10 min to 1 part by weight of a second polyethylene, having a melt index of 4.7 g/10 min, an intermediate molecular weight distribution and a density of 0.952 g/cm³, containing 40% by weight of ground mica. Only the homopolymer of the polyethylene type F blend was partially crosslinked using the peroxide. The melt index shown for Run 20 indicates the melt index of the crosslinked homopolymer and not for the polyethylene type F blend.

The operating conditions of the blown film process of Runs 16, 17 and 21 were adjusted to form films of about 25.4 μm in thickness and of Runs 18 to 20 to form films of about 43.2 μm in thickness. Because of the surface roughness of the films produced from polyethylene types E and F the film thicknesses were calculated after determining the density and the weight of a known area of film.

Further experimental details and the results obtained are shown in Tables III and IV.

TABLE III

| Run | PE[1] Type | Peroxide Concentration ppm by weight | Melt Index* (g/10 min) | Frost-line Height(cm) | Blow-up Ratio |
|---|---|---|---|---|---|
| 16** | B | None | 0.28 | 30 | 3:1 |
| 17 | B | 210 | 0.05 | 30 | 3:1 |
| 18** | E | None | 0.75 | 15 | 2:1 |
| 19 | E | 100 | 0.30 | 15 | 2:1 |
| 20 | F | 400 | 1.95 | 15 | 2:1 |

[1]PE = polyethylene
*Melt index of partially crosslinked polyethylenes determined after crosslinking but prior to extrusion into film.
**Comparison runs. The polyethylene in these runs had not been crosslinked

TABLE IV

| Run | Elmendorf Tear Strength (g/μm) Machine Direction | Elmendorf Tear Strength (g/μm) Transverse Direction | MD Elongation (%) | Dart-Drop F50 (g/μm) |
|---|---|---|---|---|
| 16* | 0.60 | 30.0 | 470 | 4.9 |
| 17 | 0.60 | 1.7 | 270 | 4.5 |
| 18* | — | 5.0 | 190 | — |
| 19 | — | 3.0 | 55 | — |
| 20 | — | 1.2 | 54 | — |

*Comparison runs. The polyethylene in these runs had not been crosslinked.

EXAMPLE III

The procedure of Example II was repeated except that the polyethylene was extruded through an annular die having an average diameter of 25.4 mm and a die gap of 0.68 mm.

Polyethylene type G was an ethylene homopolymer having prior to crosslinking a narrow molecular weight distribution, a density of 0.955 g/cm³ and a melt index of 1.0 g/10 min.

The operating conditions of the blown film process were adjusted to form a film of about 25.4 μm in thickness. The film thickness and concentration of 2,5-dimethyl 2,5-di(t-butyl peroxy) hexyne-3 were calculated as described in Example III.

Further experimental details and the results obtained are shown in Tables V and VI.

TABLE V

| Run | Poly-ethylene Type | Peroxide Concentration (ppm by weight) | Melt Index* (g/10min) | Frost Line Height (cm) | Blow-up Ratio |
| --- | --- | --- | --- | --- | --- |
| 21** | G | none | 1.0 | 10 | 4:1 |
| 22 | G | 90 | 0.32 | 10 | 4:1 |
| 23 | G | 190 | 0.08 | 10 | 4:1 |

*Melt index determined on polyethylenes after crosslinking but prior to extrusion into film.
**Comparison runs. The polyethylene in these runs had not been crosslinked.

TABLE VI

| | Elmendorf Tear Strength (g/$\mu$m) | |
| --- | --- | --- |
| Run | Machine Direction | Transverse Direction |
| 21* | 0.92 | 14.0 |
| 22 | 0.88 | 6.0 |
| 23 | 0.80 | 4.2 |

*Comparison run. The polyethylene in this run had not been crosslinked.

I claim:

1. A blown film process in which partially crosslinked polyethylene is extruded into film having a thickness in the range of 10 to 100 $\mu$m, said process having a blow-up ratio in the range of 1.2:1 to 4:1 and a MD draw down ratio in the range of 2 to 60, said polyethylene having had before crosslinking, a density in the range of 0.940 to 0.970 g/cm$^3$ and a melt index in the range of 0.2 to 15.0 g/10 min and having been crosslinked to an extent sufficient to provide, after extrusion in said blown film process, a film having an Elmendorf tear strength in the transverse direction substantially less than the Elmendorf tear strength in the transverse direction of a film produced from the polyethylene, before crosslinking, under the same conditions as the film produced from the partially crosslinked polyethylene.

2. A process according to claim 1 where in the film thickness is in the range of 10 to 100 $\mu$m and the MD draw down ratio is in the range of 3 to 60.

3. A process according to claim 2 where in the film is extruded to a thickness between 25 and 35 $\mu$m and the polyethylene is crosslinked to an extent sufficient to provide a film having an Elmendorf tear strength in the transverse direction in the range of 0.4 to 10 g/$\mu$m.

4. A process according to claim 2 where in the film is extruded to a thickness between 25 and 35 $\mu$m and the polyethylene is crosslinked to an extent sufficient to provide a film having an Elmendorf tear strength in the transverse direction in the range of 0.4 to 2.5 g/$\mu$m.

5. A process according to claim 2 where in the film is extruded to a thickness between 35 and 100 $\mu$m and the polyethylene is crosslinked to an extent sufficient to provide a film having an Elmendorf tear strength in the transverse direction in the range of 10 to 150 g.

6. A process according to claim 2, where in the MD draw down ratio is in the range of 6 to 40.

7. A process according to claim 2, where in the blow up ratio is from 1.2:1 to 2.5:1.

8. A process according to claim 2, where in the frost line height is in the range of 10 to 66 cm.

9. A process according to claim 8 where in the frost line height is in the range of 10 to 40 cm.

10. A process according to claim 3 wherein the polyethylene is selected from the group consisting of a homopolymer of ethylene, a copolymer of ethylene and a higher $\alpha$-olefin having 4 to 10 carbon atoms, and mixtures thereof.

11. A process according to claim 4 wherein the polyethylene is selected from the group consisting of a homopolymer of ethylene, a copolymer of ethylene and a higher $\alpha$-olefin having 4 to 10 carbon atoms, and mixtures thereof.

12. A blown film produced from partially crosslinked polyethylene consisting essentially of polyethylene which, before being crosslinked, had a density in the range of 0.940 to 0.970 g/cm$^3$ and a melt index in the range of 0.2 to 15.0 g/10 min. and which, after being crosslinked, exhibits an Elmendorf tear strength in the transverse direction substantially less than the Elmendorf tear strength in the transverse direction of a blown film produced from such polyethylene before being crosslinked under the same conditions as the film produced from the partially crosslinked polyethylene.

13. The blown film of claim 12 wherein the film thickness is in the range of 10 to 100 $\mu$m and the MD draw down ratio is in the range of 2 to 60.

14. The blown film of claim 12 wherein the film of partially crosslinked polyethylene exhibits an Elmendorf tear strength in the range of 0.4 to 10 g/$\mu$m.

15. The blown film of claim 12 wherein the polyethylene is selected from the group consisting of a homopolymer of ethylene, a copolymer of ethylene and a higher $\alpha$-olefin having 4 to 10 carbon atoms, and mixtures thereof.

* * * * *